(12) United States Patent
Kikuchi et al.

(10) Patent No.: US 6,757,303 B1
(45) Date of Patent: Jun. 29, 2004

(54) TECHNIQUE FOR COMMUNICATING TIME INFORMATION

(75) Inventors: Takeshi Kikuchi, Hamamatsu (JP); Yuji Koike, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/272,506

(22) Filed: Mar. 19, 1999

(30) Foreign Application Priority Data

Mar. 27, 1998 (JP) .......................................... 10-081323

(51) Int. Cl.[7] ................................................. H04J 3/06
(52) U.S. Cl. ...................... 370/509; 370/516; 370/538; 375/356; 375/362; 375/371
(58) Field of Search ................................. 370/503, 516, 370/538, 509, 517, 395.62; 709/248; 713/400, 505; 375/356, 357, 362, 364, 324, 327, 328, 340, 373, 374, 376

(56) References Cited

U.S. PATENT DOCUMENTS

| | | | | |
|---|---|---|---|---|
| 5,670,732 A | * | 9/1997 | Utsumi et al. ................. | 84/645 |
| 5,710,800 A | * | 1/1998 | Ito ............................. | 375/370 |
| 5,731,534 A | * | 3/1998 | Tamura et al. ................. | 84/662 |
| 5,734,119 A | | 3/1998 | France | |
| 5,892,171 A | * | 4/1999 | Ide ............................. | 84/622 |
| 5,977,468 A | * | 11/1999 | Fujii ........................... | 84/609 |
| 5,995,570 A | * | 11/1999 | Onvural et al. ............. | 375/356 |
| 6,009,131 A | * | 12/1999 | Hiramatsu ................... | 375/354 |
| 6,097,709 A | * | 8/2000 | Kuwabara .................... | 370/331 |
| 6,133,875 A | * | 10/2000 | Kishimoto .................. | 342/375 |
| 6,167,048 A | * | 12/2000 | Law et al. ............. | 370/395.62 |

FOREIGN PATENT DOCUMENTS

| | | |
|---|---|---|
| JP | 05-189385 | 7/1993 |
| JP | 9-503070 | 3/1997 |

* cited by examiner

Primary Examiner—Steven H. D. Nguyen
Assistant Examiner—Roberta Stevens
(74) Attorney, Agent, or Firm—Morrison & Foerster LLP

(57) ABSTRACT

A communication device comprises reception means for receiving externally supplied first time information representing time, time information generation means for generating second time information representing time, time difference detection means for detecting a time difference between the times represented by the received first time information and the second time information generated at a time point at which the first time information is received, and correction means for correcting the second time information generated by said time information generation means based on the received first time information when the time difference is greater than a predetermined value.

32 Claims, 12 Drawing Sheets

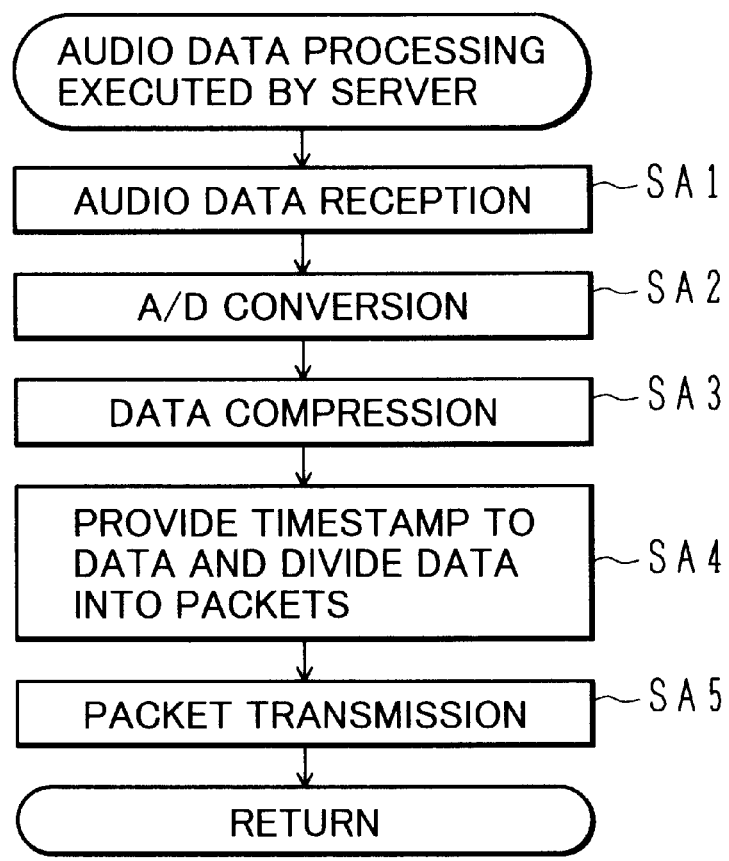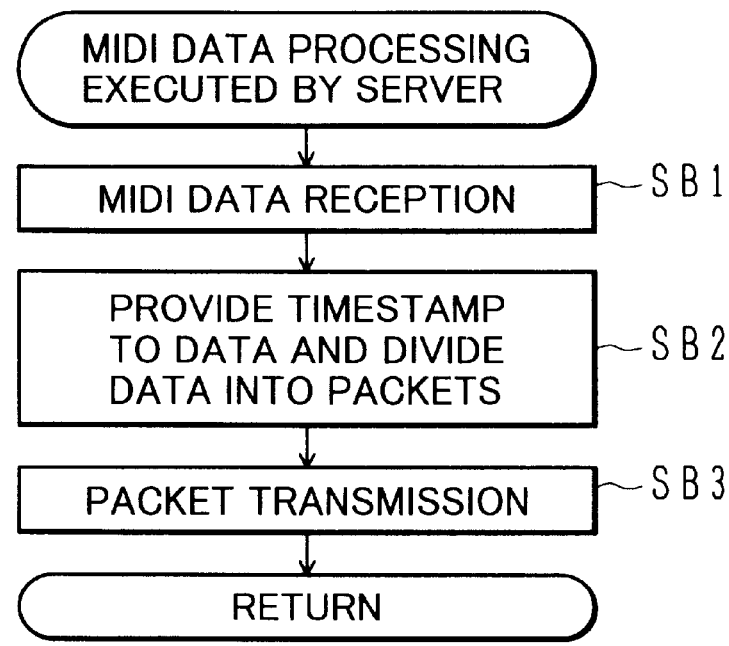

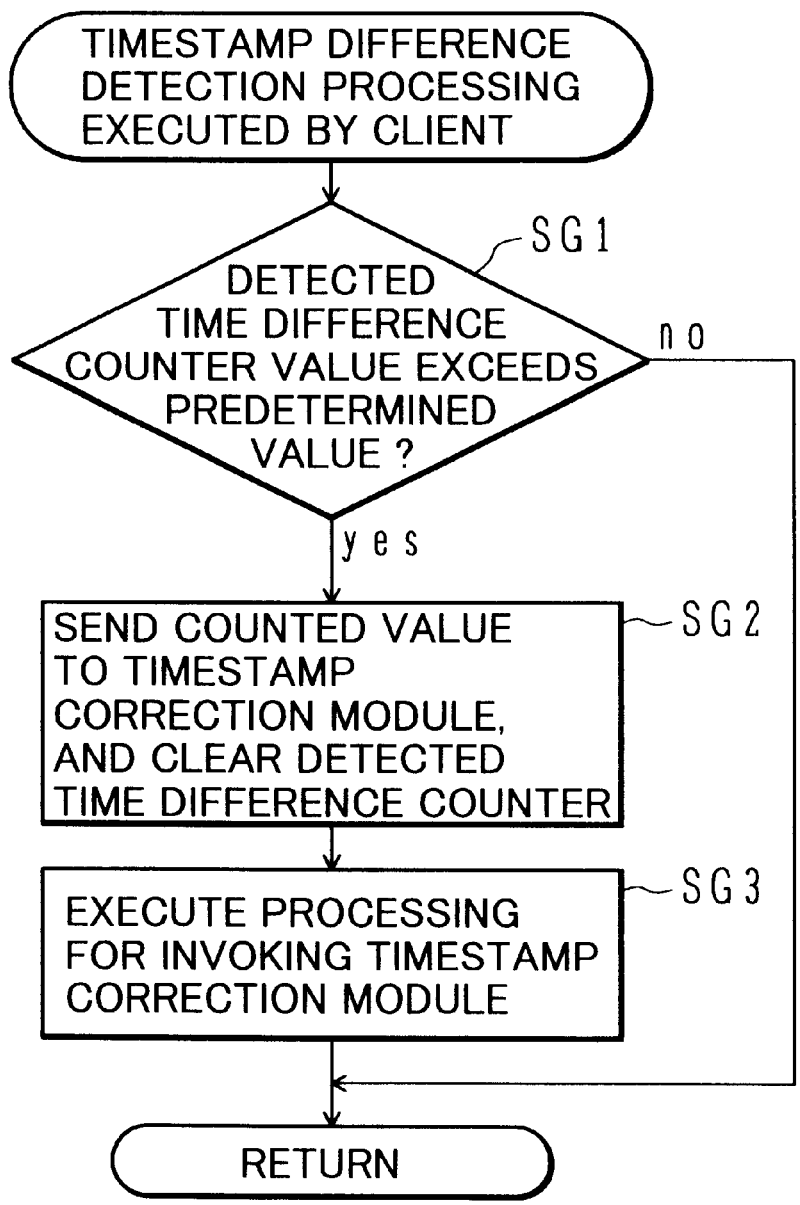

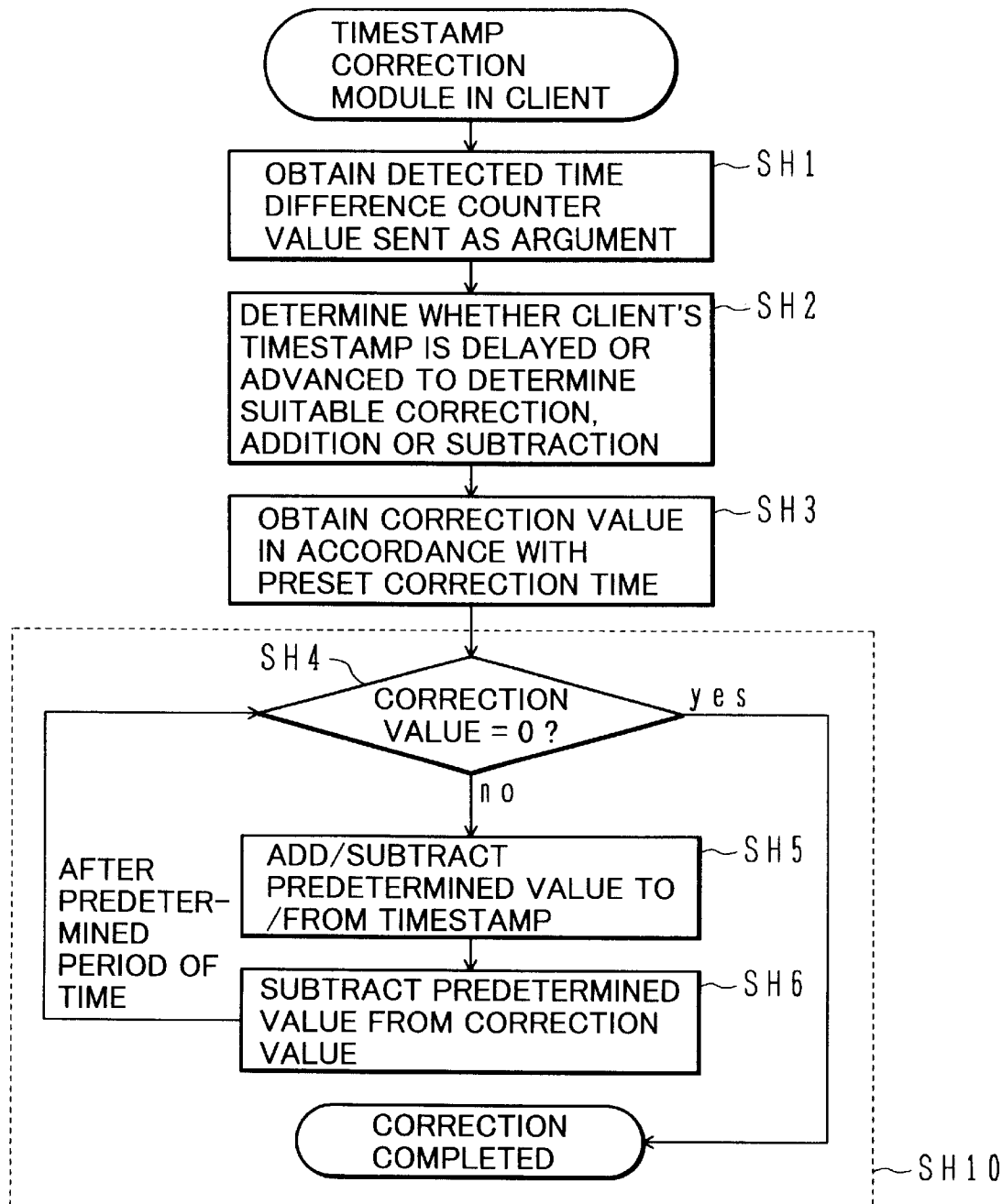

TECHNIQUE FOR COMMUNICATING TIME INFORMATION

This application is based on Japanese patent application No. 10-81323 filed on Mar. 27, 1998, the entire contents of which are incorporated herein by reference.

BACKGROUND OF THE INVENTION a) Field of the Invention

The present invention relates to a communication technique, more particularly to a technique for communicating time information.

b) Description of the Related Art

There is a standard for communication among electronic musical instruments called Musical Instrument Digital Interface (MIDI). An electronic musical instrument having a MIDI standardized interface can be connected to other electronic musical instruments via MIDI cables. This connection enables the instruments to communicate MIDI data from each other via the MIDI cables. For example, a player plays a musical piece with one electronic musical instrument and the instrument transmits MIDI data representing the played musical piece to another electronic musical instrument, and the instrument which receives the MIDI data can reproduce the musical piece. That is, connected electronic musical instruments can simultaneously reproduce a musical piece which is played by a player with one instrument.

A communication network connecting a plurality of general purpose computers enables the connected computers to communicate various information with each other. For example, a computer stores information like audio data (representing notes produced by non-electronic musical instruments), MIDI data, or the like in its hard disk drive or the like and transmits the information to other computers via the communication network. The computer which receives the information can store the received information in its storage device such as a hard disk drive. Such a general purpose computer communication network can be a medium for communicating information among computers, however, its property differs from that of the MIDI network.

The MIDI standard realizes real time communication among the electronic musical instruments, however, it is not suitable for long distance communication and communication among multiple nodes. On the contrary, the general purpose computer network is suitable for the long distance communication and communication among multiple nodes, however, it is not designed for the real time communication among the electronic musical instruments.

In case of communicating time information via the general purpose computer network, each of a transmitter and a receiver connected to the general purpose computer network has its own timer which generates time information representing date and time. Since the timers in the transmitter and the receiver are generally not synchronized with each other, both time information values do not always coincide with each other.

In other words, the time information value sent from the transmitter does not always coincide with the receiver's own time information value. In such a case, various problems may occur when the receiver executes data processing in accordance with the received time information.

On the other hand, since the general purpose computer network is used for the long distance communication and data go through various routes on the network, time periods for communicating data packets are not always the same. Such differences in the time periods may influence the data processing in the receiver if it is performed in accordance with the received time information.

SUMMARY OF THE INVENTION

It is an object of the present invention to provide a communication device, a communication method, and a medium recording a program all of which improve the reliability of time information communication.

According to one aspect of the present invention, there is provided a communication device comprises:

a receiver which receives externally supplied first time information representing time;

a time information generator which generates second time information representing time;

a time difference detector which detects a time difference between the times represented by the received first time information and the second time information generated at a time point at which the first time information is received; and a corrector which corrects the second time information generated by said time information generator based on the received first time information when the time difference is greater than a predetermined value.

The first time information is generated by an external transmitter and a receiver receives the first time information from the transmitter. The second time information is generated by the time information generator. The first time information data and the second time information data are not always synchronous with each other. When the detected time difference between times represented by the first time information and the second time information exceeds a predetermined value, the second time information is corrected, so that the time difference between the times represented by the first time information and the second time information is reduced.

Accordingly, even if the first time information received from the external transmitter is not synchronized with the second time information generated by the receiver, the second time information is corrected based on the detected time difference between the times represented by thee first time information and the second time information. This correction prevents problems caused by the time difference between the times represented by the first time information and the second time information.

BRIEF DESCRIPTION OF THE DRAWINGS

FIG. 7 is a flowchart showing audio data processing executed by the server.

FIG. 8 is a flowchart showing MIDI data processing executed by the server.

FIG. 13 is a flowchart showing time difference detection processing executed by the client.

FIG. 14 is a flowchart showing timestamp correction processing executed by the client.

DESCRIPTION OF THE PREFERRED EMBODIMENT

Figure 2:
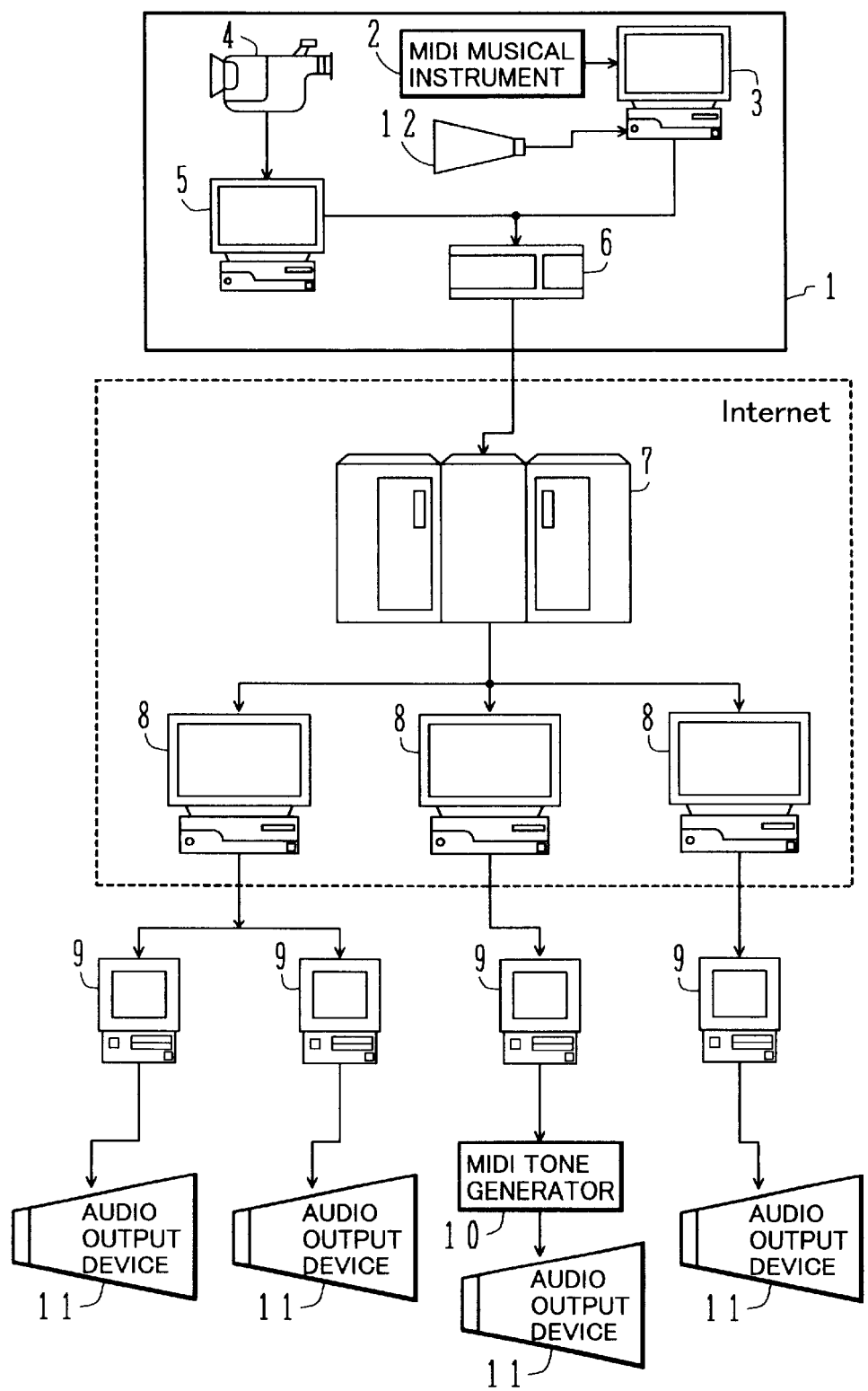
FIG. 2 is a schematic diagram showing a communication network for communicating audio information and image information.

FIG. 2 is a schematic diagram showing a communication network for communicating audio information and image information.

Installed in a hall 1 are a MIDI musical instrument 2, an audio input device 12, a camera 4, encoders 3 and 5, and a router 6. The audio input device 12 is, for example, a microphone. In the hall 1, a player plays a musical piece with the MIDI musical instrument 2 and a singer sings a song with the played musical piece toward the audio input device 12. Or, the audio input device 12 may be placed near the drums, the piano, or an output device of the electric guitar to input its sounds thereto.

The MIDI musical instrument 2 generates MIDI data in accordance with the player's action for playing the musical piece and simultaneously supplies the generated MIDI data to the encoder 3. The audio input device 12 generates an analog audio signal (speech signal) after converting the input singer's voice, drum sounds, or the like into an electric signal, and supplies the generated audio signal to the encoder 3 in real time. The encoder 3 converts the input analog audio signal into digital audio data (speech data) and sends the input MIDI data and converted audio data in their own data formats to the internet via the router 6 in the form of packet transmission. The data formats will be described with reference to FIGS. 4A and 4B.

The camera 4 captures the player's performance and supplies the captured picture as image data to the encoder 5 in real time. The encoder 5 sends the input image data in its own data format to the internet via the router 6 in the form of packet transmission.

The router 6 transmits the MIDI data, audio data, and image data to a server 7 and other World Wide Web (WWW) servers 8 via the internet using a telephone line or a directly-connected line. The WWW server 8 is so called an internet service provider.

A user connects his/her home computer 9 to one of the WWW servers 8 for using the internet. The home computer 9 receives the MIDI data, the audio data, and the image data through the internet. The home computer 9 comprises a display device and a MIDI tone generator (sound source). The MIDI tone generator is connected to an audio output device 11.

The display device displays thereon images represented by the received image data. The MIDI tone generator converts the received MIDI data into an tone signal. The audio output device 11 reproduces the tone signal and sounds the reproduced tones. The MIDI tone generator also converts the received audio digital data into analog audio data, and the audio output device 11 reproduces the analog audio data and sounds the reproduced tones. The home computer 9 controls the MIDI data and the audio data so as to be synchronized with each other and controls the audio output device 11 so as to reproduce the synchronized data and sound the reproduced tones. Accordingly, the sounds and voices produced in the hall 1 are reproduced by the audio output device 11 in real time.

Even in case of the MIDI tone generator 10 being not installed in the home computer 9, the home computer can control the externally connected MIDI tone generator 10 to generate a tone signal and control the audio output device 11 connected to the external MIDI tone generator 10 to reproduce the generated tone signal and sound the reproduced tones.

Since a user who prefers reproducing musical performance with his/her home computer 9 lays emphasis on the MIDI and audio data rather than the image data, the MIDI data and the audio data are processed prior to the image data. Such a user does not stick to the quality of the reproduced image data even if it is rough and frames are poor, however, requires high quality in the sounds reproduced from the MIDI data and the audio data. On the contrary, in a case where a user prefers watching live sports, he/she lays emphasis on the image data rather than the MIDI and audio data.

The user being away from the hall 1 can see the live performance and listen the sounds and voices produced in the hall 1 through the display device in real time while staying at home. Moreover, anyone who can connect his/her home computer 9 to the internet can listen to the sounds and voices produced in a remote place. For example, an infinite number of people staying at home can enjoy a concert played in the hall 1 without going to the concert hall.

It seems like the player in the remote hall plays an electronic musical device in each user's house, because the MIDI data in accordance with the player's performance in the hall controls the sound source installed in the house. Moreover, the MIDI data is not influenced by any noise unlike the analog audio data communication.

Figure 3:
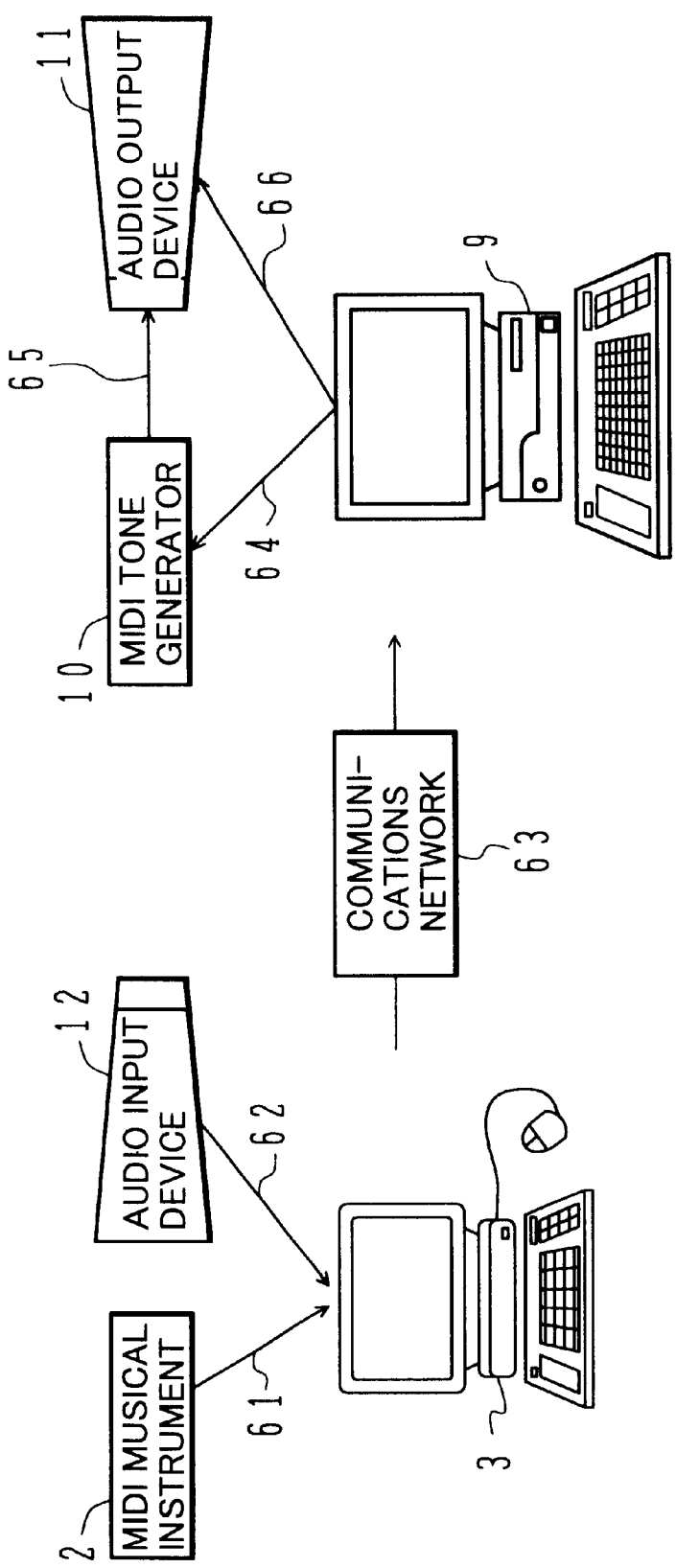
FIG. 3 is a schematic diagram showing a connection between an encoder (server) as a transmission terminal and a home computer (client) as a reception terminal.

FIG. 3 shows the encoder 3 which works as a transmission terminal and the home computer 9 which works as a reception terminal. Since the encoder 3 and the home computer 9 are in a client-server relationship, the encoder 3 will be referred to as server 3 and the home computer 9 will be referred to as client 9 hereinafter for easy understanding.

The server 3 and the client 9 are connected from each other via an ISDN line 63, that is, they are connected to the internet. The server 3 receives MIDI data 61 from the MIDI musical instrument 2 and receives an analog audio signal 62 from the audio input device 12. The server 3 converts the analog audio signal 62 into digital audio data, and transmits the converted audio data and the MIDI data to the client 9. The client 9 sends the received MIDI data 64 to the MIDI tone generator 10. The client 9 converts the received digital audio signal into an analog audio signal 66 and sends it to the audio output device 11. The MIDI tone generator 10 generates an analog tone signal 65 based on the received MIDI data 64 and sends it to the audio output device 11. The audio output device 11 reproduces the received analog audio signal 66 and tone signal 65 and sounds the reproduced tones. Similarly, the server 3 transmits the image data to the client 9 so as to be displayed on the display device connected to the client 9.

Figure 4A:
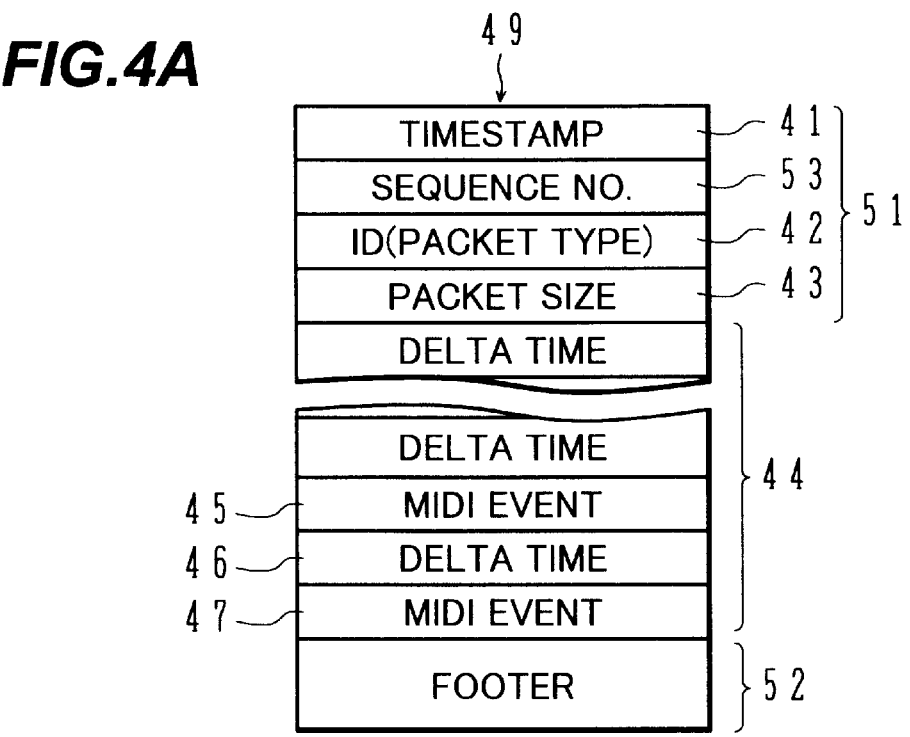
FIG. 4A is a schematic diagram showing the data structure of a MIDI data packet.

FIG. 4A shows the data structure of a MIDI data packet 49 transmitted by the server 3.

The MIDI data packet 49 includes a header 51, MIDI data 44, and a footer 52. The header 51 comprises timestamps 41 indicating time information, sequence number 53 indicating packet order, an identification code (ID) 42 indicating that this packet includes the MIDI data, and packet size 43.

The timestamps 41 represent time information including not only when the MIDI data 44 in the packet 49 is transmitted, but when the performance starts, when the recording starts, and also when the reproduction starts. The server 3 generates the timestamps 41 in accordance with time information generated by its own system clock (timer).

The sequence number 53 represents a packet order No. given to each packet. The sequence number 53 is helpful when a communication error occurs. That is, the client 9 can sort the packets in order in accordance with the sequence number 53 when the client 9 receives the packets in incorrect order because of the communication error. In such a case, the client 9 buffers the packets for a predetermined time period, and sorts the buffered packets. Thus, the client 9 can recover the communication error.

The identification code 42 represents the packet type such as a MIDI data packet, an audio data packet, and an image data packet. Since a case of transmitting the MIDI data 44 will be described in this embodiment, the identification code 42 represents the MIDI data packet.

The MIDI data 44 is prepared in the Standard MIDI file format so as to consist of data strings including combinations of a MIDI event and delta time (interval) 46. The delta time 46 indicates time interval between the former MIDI event 45 and following MIDI event 47. If there is no time interval, the delta time may be omitted.

The footer 52 indicates data end. The header 51 or the footer 52 may have check sum. The check sum indicates, for example, the sum of the MIDI data 44. The server 3 calculates the sum of the MIDI data 44 and add it to the packet as the check sum. The client 9 calculates the sum of received MIDI data 44 and compares the calculated sum and the check sum in the packet. If the calculated sum coincides with the check sum, the client 9 recognizes that the data is received successfully without any communication errors.

Figure 4B:
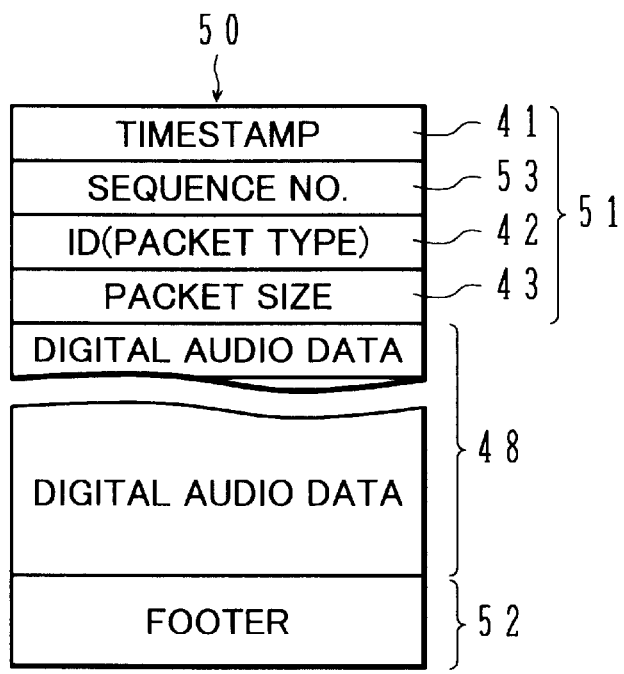
FIG. 4B is a schematic diagram showing the data structure of an audio data packet.

FIG. 4B shows the data structure of an audio data packet 50 transmitted by the server 3.

The audio data packet 50 comprises a header 51, digital audio data 48, and a footer 52. The digital audio data 48 is compressed data after A/D conversion from data generated by the audio input device 12 (FIG. 3) to digital data.

Similar to the case of the MIDI data packet 49, the header 51 includes timestamps 41, sequence number 53, an identification code (ID) 42, and packet size 43. The timestamps 41 indicates the time at which the digital audio data 48 in the packet 50 is transmitted, and the like as well as the case of the MIDI data packet 49.

The structure of the image data packet is similar to that of the audio data packet 50.

The relationship between the timestamps and communication time will now be described. Each packet includes the timestamps. The client 9 executes MIDI data processing or the like in accordance with the timestamps.

A period of communication time required for each packet during being communicated through the internet or the like is not always equal. That is, one packet requires a long communication time period while others do shorter. Such a difference often appears in case of the long distance communication or each packet goes through different route on the internet.

A communication error sometimes causes packet sequence disorder. In other words, transmission order of the packets is changed when the packets are received.

The client 9 buffers the received data into its buffer memory, and starts data processing after a predetermined time period (for example, 3 seconds) has lapsed since the time represented by the timestamp.

Thus, the time differences among the time periods required for the packets are equalized. Moreover, the client 9 sorts the buffered packets in accordance with the sequence number 53 (FIGS. 4A and 4B), so that the packet sequence disorder is recovered.

Influences caused by a difference between times represented by the time information pieces generated by the system clocks in the server 3 and the client 9 will now be described. Since the system clocks in the server 3 and the client 9 are not synchronized with each other, that is, each of them generates its own time information piece. Like general clocks, accuracy of the system clocks may decrease or increase as time passed.

If the system clock in the client 9 indicates the time earlier than that indicated by the server's system clock, for example, the client 9 will lose its function of buffering data only for a predetermined time period. In this case, the client 9 starts to process the data packets in the buffer memory 3 seconds after the timestamp at the beginning, however, the waiting time period is gradually shortened. Eventually, the client 9 must process the data packets immediately after the data packets are buffered.

On the contrary, if the system clock in the client 9 indicates the time later than that indicated by the server's system clock, the buffer memory will be filled with the data packets. In this case, the client 9 starts to process the data packets in the buffer memory 3 seconds after the timestamp at the beginning, however, the waiting time period is gradually extended. If the buffer memory capacity is small, some of the data packets may be overflowed and lost.

To eliminate the above problems, the system clock in the client 9 is corrected so as to be synchronized with the system clock in the server 3. More precisely, the timestamp generated by the system clock in the client 9 is made to coincide with the timestamp generated by the system clock in the server 3. Detailed process of this correction will now be described.

Figure 1A:
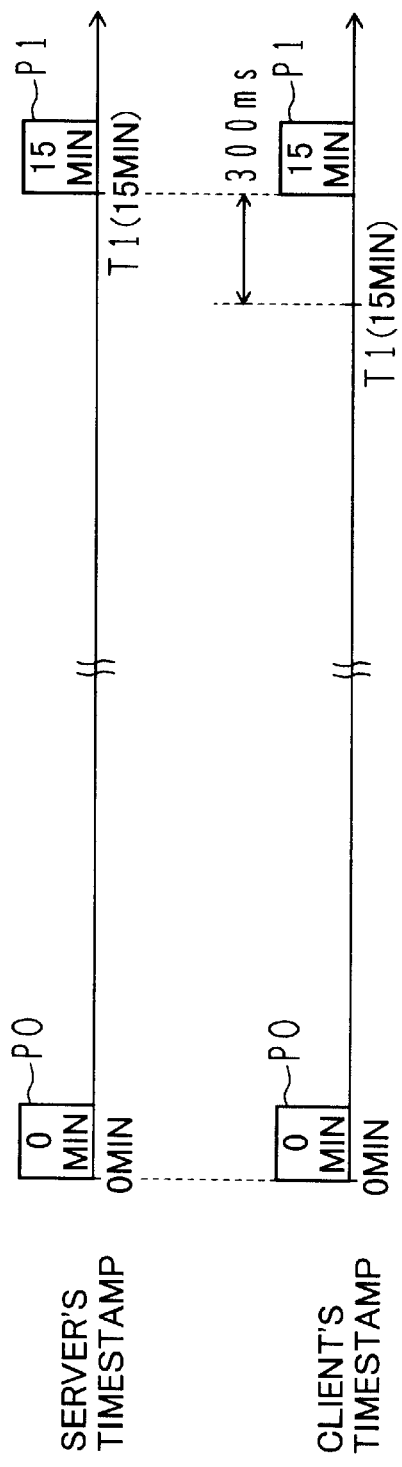
FIG. 1A is a timing chart showing a time difference between timestamps.

FIG. 1A is a timing chart showing the time difference between the timestamps of the server and the client. In the timing chart, the horizontal axis indicates a lapse of time.

At the beginning of data transmission, the server sets a timestamp with a reference time 0, and sends a packet P0 including the set timestamp to the client. The system clock in the server counts up the timestamp subsequently.

The client receives the packet P0 which includes the server's timestamp indicating the reference time 0 and simultaneously sets client's timestamp with a reference time 0. The system clock in the client counts up its own timestamp subsequently.

A case where the client's timestamp advances rather than the server's timestamp will now be described. For example, if the client's timestamp indicates 15 min 300 msec. when the server's timestamp indicates just 15 min, the client's timestamp gains 300 msec.

At a point where 15 minutes has passed since the first data transmission, the server sends a packet P1 including a timestamp indicating 15 min to the client. The client receives the packet P1 and simultaneously compares its timestamp and the server's timestamp in the packet P1. After the comparison, the client recognizes that its own timestamp gains 300 msec.

Figure 1B:
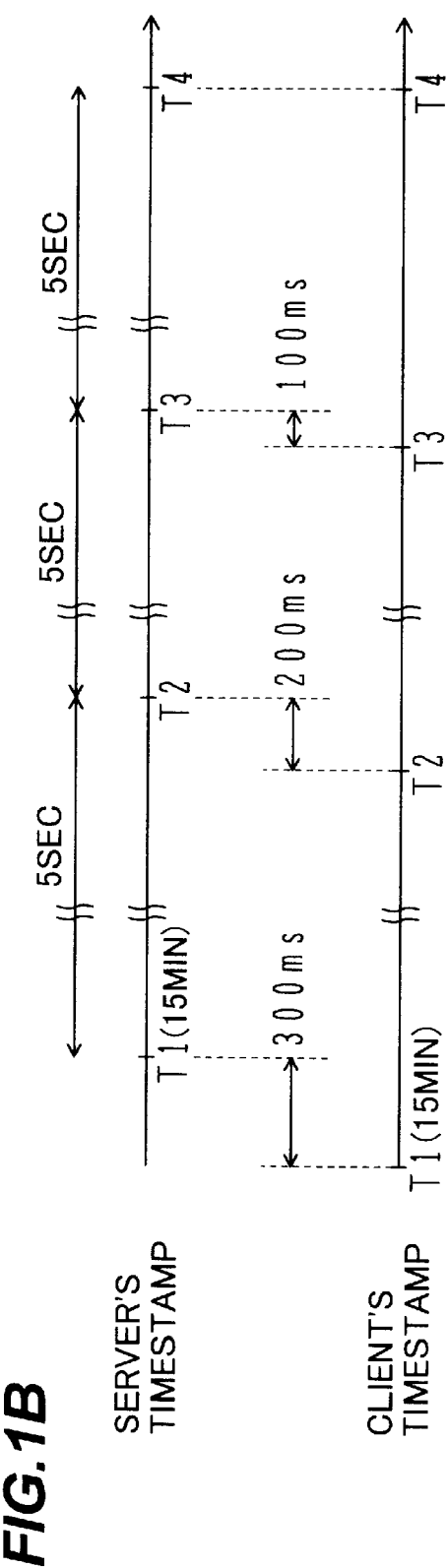
FIG. 1B is a timing chart for explaining time difference correction.

FIG. 1B is a timing chart for explaining how the time difference between the timestamps is reduced. In the timing chart, the horizontal axis indicates a lapse of time. Time T1 denotes a time point where the timestamps of the server and the client has lapsed in 15 minutes.

The time T1 in the server's timestamp is 300 msec behind the time T1 in the client's timestamp. When the client recognizes that its own timestamp gains 300 msec or more, it starts to correct the difference between the timestamps. The correction processing goes on step by step, not radically. The method for the correction will now be described.

There is a time difference of 300 msec at time T1. The client's timestamp is reduced only for 100 msec until the timestamp reaches time T2 which is 5 seconds behind the time T1. Thus the time difference at the time T2 becomes 200 msec. Then, the client's timestamp is reduced for 100 msec again until the timestamp reaches time T3 which is 5 seconds behind the time T2. Thus the time difference at the time T3 becomes 100 msec. Finally, the client's timestamp is reduced for 100 msec until the timestamp reaches time T4 which is 5 seconds behind the time T3. Thus, the time difference is recovered at the time T4 and the correction processing is completed. The correction process takes 3 steps and the timestamp is reduced for 100 msec in each step. The total time period required for correcting the difference is approximately 15 seconds.

The time differences between the timestamps appear irregularly in accordance with accuracy of the system clock or communication status. For example, a time difference of 300 msec appears in reception of a packet, however, another time difference of 100 msec may appear in reception of another packet. Since delay or advance of time in the timestamps is a temporary phenomenon, it may be recovered without corrections. The above correcting process may be carried out when a predetermined number of packets each of which has a time difference of 300 msec or more are received.

Figure 5:
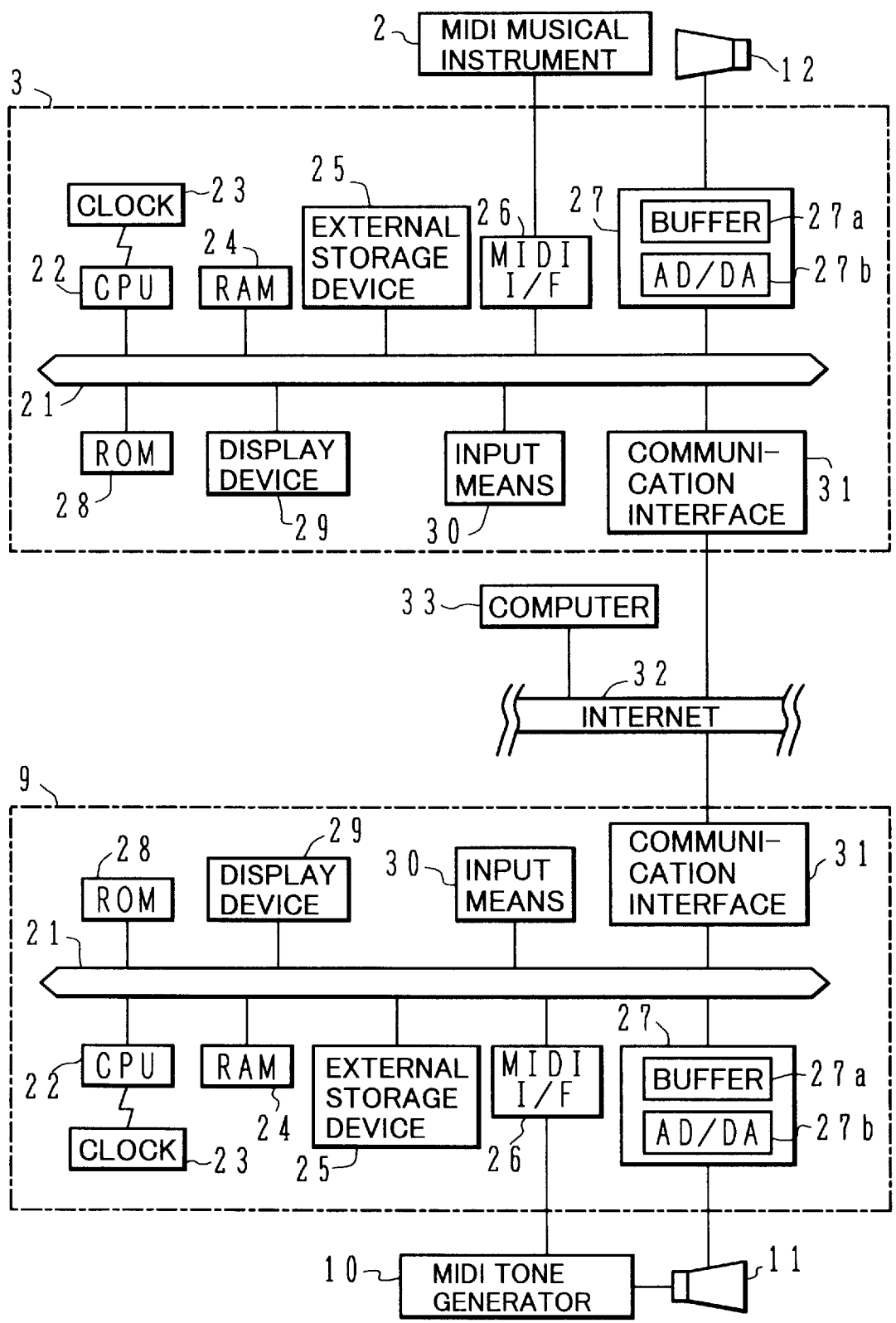
FIG. 5 is a block diagram showing the hardware structure of the server and the client.

FIG. 5 is a block diagram showing more detailed hardware components shown in FIG. 3. General purpose computers or personal computers may be used as the server 3 and the client 9.

The server 3 and the client 9 have the similar structures. Common components in the server 3 and the client 9 will now be described. Each bus 21 connects a CPU 22, a RAM 24, an external storage device 25, a MIDI interface 26 for communicating MIDI data with a connected external device, a sound board (card) 27, a ROM 28, a display device 29, an input means 30 such as a keyboard, switches, a mouse, or the like, and a communication interface 31 for internet connection.

The sound board 27 comprises a buffer 27a and a coder and a decoder (CODEC) circuit 27b. The buffer 27a buffers input data or data to be output. The CODEC circuit 27b comprises an A/D converter and a D/A converter thus intermediates between digital data and analog data. The CODEC circuit 27b further comprises a compressing/decompressing circuit thus is able to compress or decompress data. Data to be transmitted to the internet is compressed data.

The external storage device 25 is, for example, a hard disk drive, a floppy disk drive, a compact disc read-only memory (CD-ROM) drive, a magneto-optical disk drive, or the like, and stores data pieces such as MIDI data, audio data, image data and/or computer programs.

The ROM 28 stores computer programs and various parameters. The RAM 24 has working areas such as a buffer area and a register area, and imports data stored in the external storage device 25 and stores the imported data.

The CPU 22 executes calculations and processing in accordance with the computer programs stored in the ROM 28 or the RAM 24. The CPU 22 obtains time information from a system clock 23 and executes timer interruption. The system clock 23 in the server 3 generates server's timestamps and the system clock 23 in the client 9 generates client's timestamps.

The server 3 and the client 9 are connected to the internet 32 via their communication interfaces 31. The communication interface 31 is an interface for transmission and reception of the MIDI data, the audio data and the image data through the internet. The server 3 and the client 9 are connected with each other via the internet 32.

The structure of the server 3 will now be described. The MIDI musical instrument 2 is connected to the MIDI interface 26 and the audio input device 12 is connected to the sound board 27. The MIDI musical instrument 2 generates MIDI data in accordance with musical performance by a player and sends the generated MIDI data to the MIDI interface 26. The audio input device 12 collects sounds in the hall and send an analog audio signal to the sound board 27. In the sound board 27, the CODEC circuit 27b converts the analog audio signal into digital audio data. The digital audio data is compressed by the compressing/decompressing circuit.

The structure of the client 9 will now be described. The MIDI tone generator 10 is connected to the MIDI interface 26 and the audio output device 11 is connected to the sound board 27. The MIDI tone generator and the audio output device 11 are connected from each other. The CPU 22 receives the MIDI data, the audio data and the image data from the internet 32 via the communication interface 31. The CPU 22 sends the received MIDI data to the MIDI tone generator 10 via the MIDI interface 26. The sound board 27 decompresses the received audio data and sends it to the audio output device 11 after D/A conversion. The audio output device 11 reproduces the MIDI data and the audio data and sounds the reproduced tones. The display device 29 displays thereon the reproduced image data.

Figure 6:
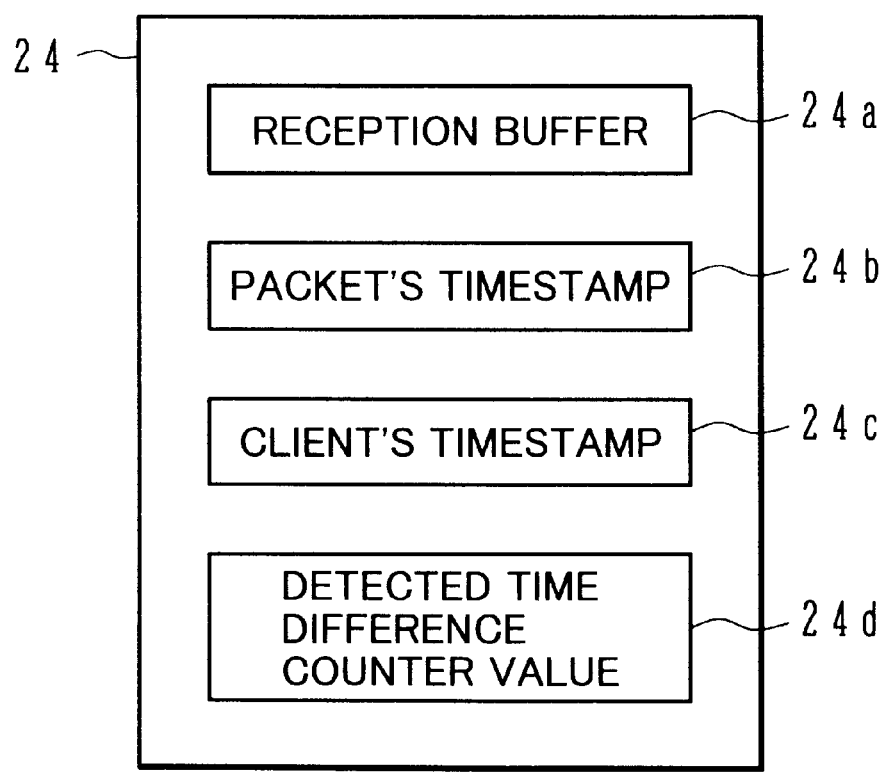
FIG. 6 is a schematic diagram showing areas in a RAM in of client.

As shown in FIG. 6, the RAM 24 in the client 9 comprises a reception buffer 24a, a register 24b for storing the timestamps (server's timestamps) in the packets, a register 24c for storing the client's own timestamps, and a register 24d for storing a detected time difference counter which represents how often a time delay (advance) in the timestamps occurs.

In FIG. 5, each of the communication interfaces 31 of the server 3 and the client 9 is not limited to the internet interface but may be an Ethernet interface, an IEEE 1394 digital communication interface, an RS-232C interface, or the like which enables the server 3 and the client 9 to connect to various networks.

The server 3 stores therein computer programs for transmitting data such as the MIDI data. The client 9 stores therein computer programs for receiving data such as the MIDI data and for correcting the difference in the timestamps. The style that the programs, parameters, and the like are stored in the external storage device 25 and those are read out to the RAM 24 for processing enables easy update or addition of the computer programs and the like.

The CD-ROM drive as the external storage device 25 is a device for reading out computer programs or the like from a CD-ROM. The read computer programs or the like are stored in the hard disk drive. Thus, installing or updating the computer programs can be done easily.

The communication interface 31 is connected to a computer 33 via the communication network 32 such as a local area network (LAN), the internet, telephone lines, or the like. Even if the computer programs are not stored in the external storage device 25, those programs are available by downloading from the computer 33. In this case, the server 3 or the client 9 sends a request command to the computer 33 via the communication interface 31 and the communication network 32. In response to the request command, the computer 33 sends the required computer programs to the server 3 or the client 9 via the communication network 32. The server 3 or the client 9 receives the computer programs via the communication interface 31 and stores the received computer programs in the external storage device 25.

This system may consist of a personal computer in which the computer programs described in the embodiment are pre-installed. In this case, the computer programs may be distributed to a user with a computer readable recording medium such as a CD-ROM or a floppy disk. If the personal computer is connected to the communication network such as LAN, internet, or telephone line, the computer program or data may be distributed to the user via the communication network.

The server 3 or the client 9 is not limited to a personal computer but may be an electronic musical instrument, a Karaoke apparatus, a television, or the like.

Figure 9:
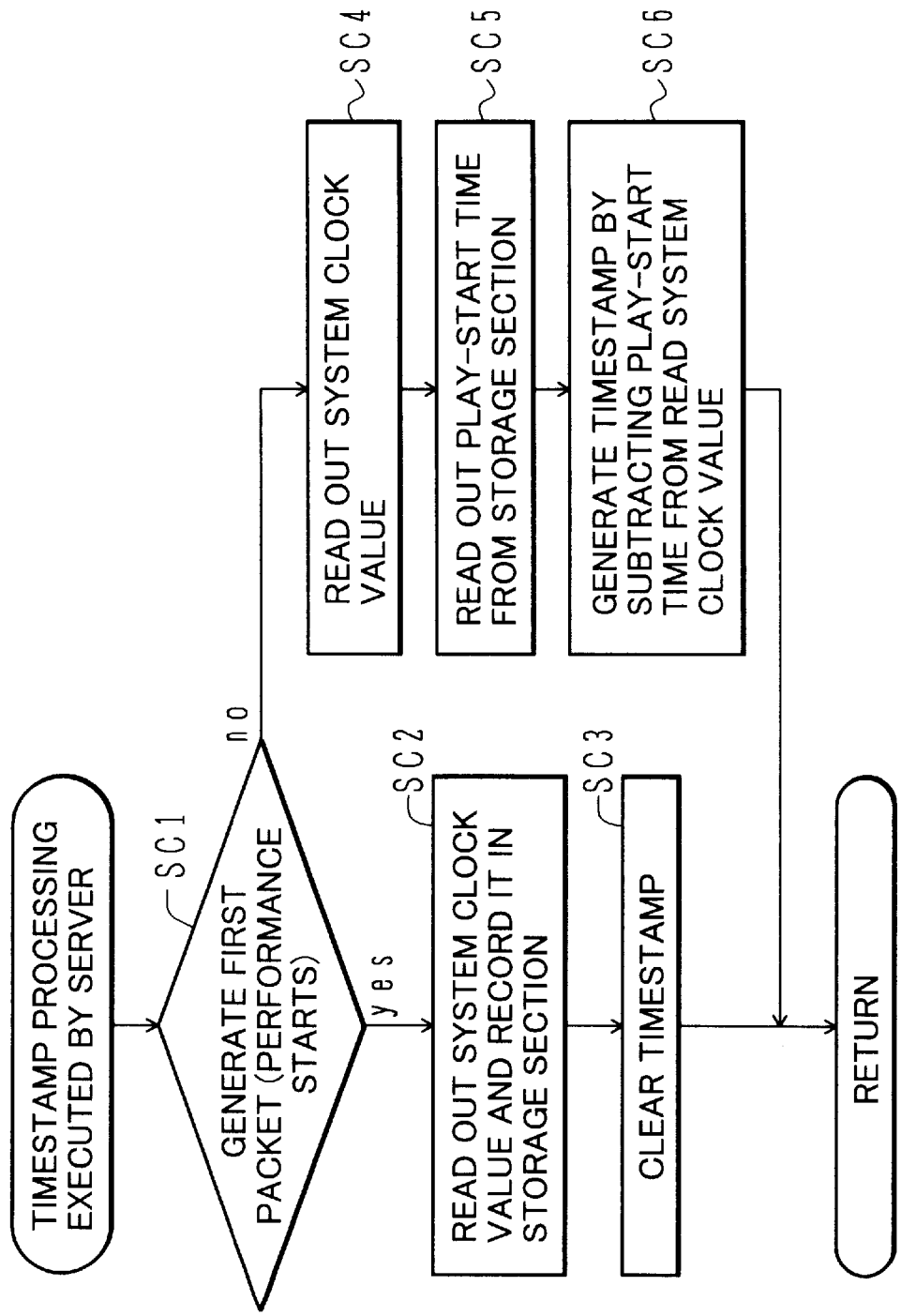
FIG. 9 is a flowchart showing timestamp generation processing executed by the server.

FIGS. 7 to 9 are flowcharts showing processing executed by the server.

FIG. 7 is a flowchart showing audio data transmission processing executed by the server.

The server receives the audio data from the audio input device 12 (FIG. 5) in step SA1.

The server converts the received audio data into digital audio data in step SA2. More precisely, the analog audio data is subjected to sampling process at a predetermined sampling rate to generate the digital audio data.

The digital audio data is compressed in step SA3 to reduce data amount. The CODEC circuit 27b (FIG. 5) carries out the analog-to-digital conversion in step SA2 and the data compression in step SA3.

A timestamp is given to the compressed data and the data divided into packets in step SA4. The structure of each packet is shown in FIG. 4B. A method for generating the timestamp will be described with reference to FIG. 9. The timestamp described here is the server's timestamp.

The packets are transmitted to the internet in step SA5, and the audio data transmission processing is completed.

FIG. 8 is a flowchart showing MIDI data transmission processing executed by the server.

The server receives the MIDI data from the MIDI musical instrument 2 (FIG. 5) in step SB1.

A timestamp is given to the received MIDI data and divided into packets in step SB2. The structure of each packet is shown in FIG. 4A. A method of generating the timestamp will be described with reference to FIG. 9. The timestamp described here is also the server's timestamp.

The packets are transmitted to the internet in step SB3, and the MIDI data transmission processing is completed.

FIG. 9 is a flowchart showing timestamp generation processing executed by the server. This processing is necessary for the packet transmission. It is preferable that this processing is done with timer interruption, however, constant execution with the timer interruption is not always required.

In step SC1, the server's CPU determines whether a packet to be generated is the first packet, that is, a packet to be transmitted first, or not. If the packet is the first packet, the flow goes to step SC2 in accordance with instruction indicating "yes". If the packet is not the first packet, the flow goes to step SC4 in accordance with instruction indicating "no".

In step SC2, the server's CPU reads out counted value of the system clock and records it in the storage section (RAM 24) as play-start time.

In step SC3, the server's CPU clears its timestamp value, that is, sets the timestamp with the reference time 0 which indicates the play start time (transmission-start time). The timestamp generation processing is now completed.

In a case where the packet is not the first packet, the processing in step SC4 will be executed after step SC1 as mentioned above.

In step SC4, the server's CPU reads out a counted value of the system clock. The read value corresponds to the transmission time of the packet.

In step SC5, the server's CPU reads out the play-start time stored in the storage section (for example, RAM 24). The play-start time is pre-recorded in the storage section in step SC2.

In step SC6, the CPU subtracts the play-start time value obtained in step SC5 from the system clock counted value obtained in step SC4. The CPU then sets the resultant value as a timestamp. The timestamp represents time information where the play-start time is set at the reference time 0, and the system clock in the server counts up the generated timestamp. The timestamp generation processing is thus completed. The timestamp may be generated based on a counted value when timer interruption occurs.

FIGS. 10 to 14 are flowcharts showing processing executed by the client.

Figure 10:
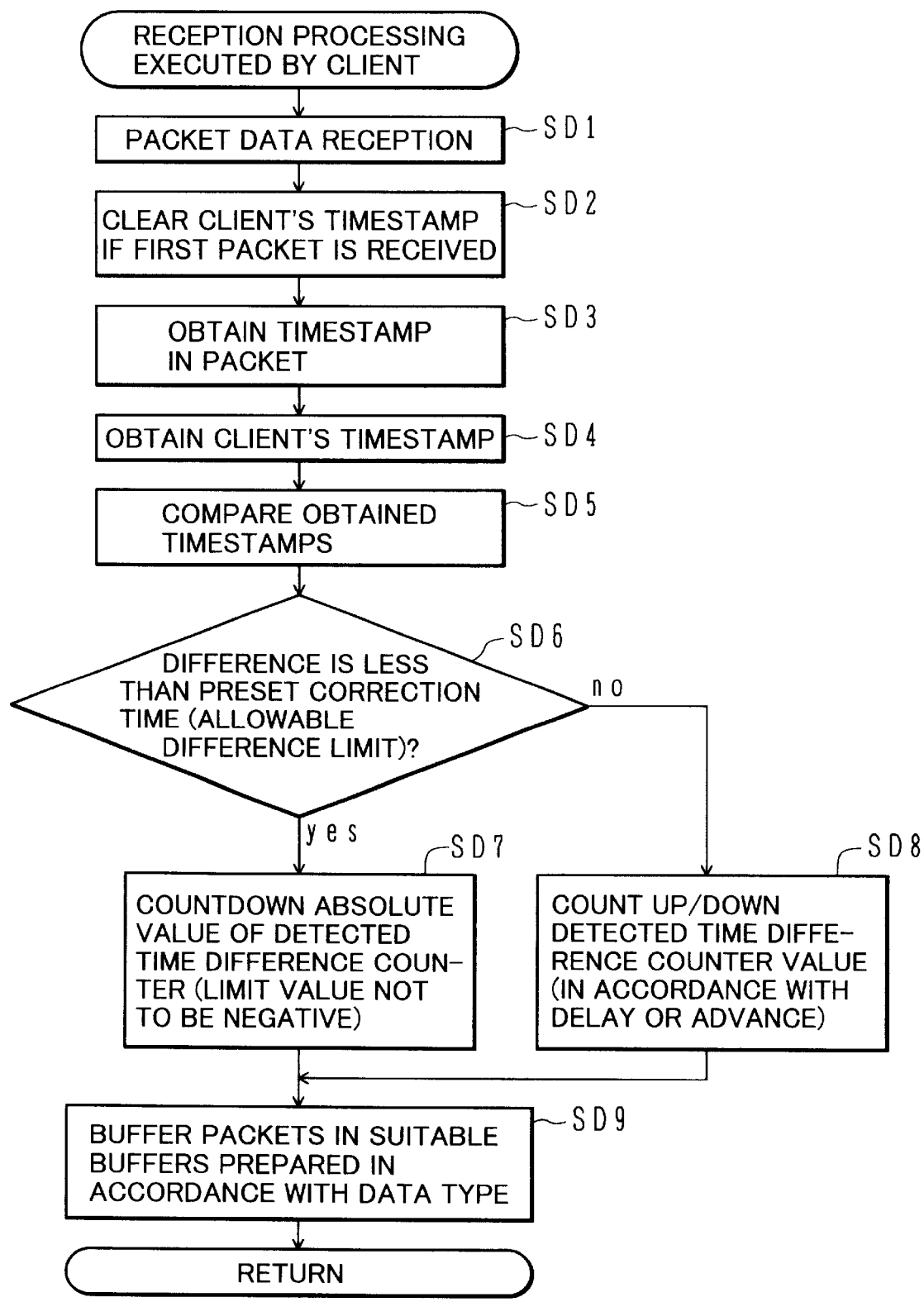
FIG. 10 is a flowchart showing reception processing executed by the client.

FIG. 10 is a flowchart showing data reception processing executed by the client.

In step SD1, the client receives a packet.

In step SD2, the client's CPU determines whether the received packet is the first packet or not. If the received packet is the first packet, the CPU clears the client's timestamp. Thus, the client's timestamp is coincided with the server's timestamp because the server's timestamp in the first packet indicates 0.

Figure 11:
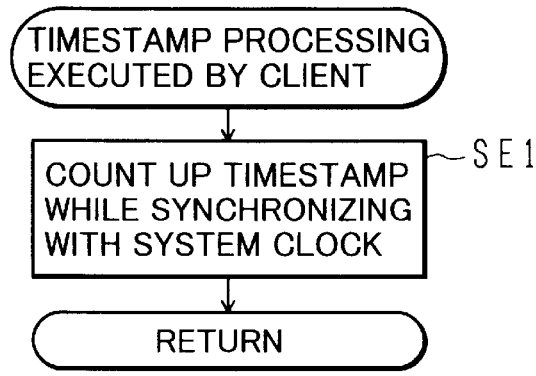
FIG. 11 is a flowchart showing timestamp generation processing executed by the client.

As shown in a flowchart of FIG. 11, the client's timestamp is generated based on timer interruption by the client. In step SE1, the generated time stamp is counted up in accordance with the system clock, that is, increase of the timestamp is synchronized with the system clock. The client's timestamp may be generated in the same manner shown in FIG. 9 which is a method employed in the server.

In step SD3 in FIG. 10, the CPU obtains the timestamp in the received packet. The obtained timestamp generated by the server represents a time lapse since the play-start time. If the packet concerned is the first packet, the timestamp therein represents the reference time 0.

In step SD4, the CPU obtains the client's timestamp. The client's timestamp is counted up in accordance with the timestamp processing shown in FIG. 11.

In step SD5, the CPU compares the timestamp in the packet obtained in step SD3 with the client's timestamp obtained in step SD4 and obtains a difference therebetween.

In step SD6, the CPU determines whether the obtained difference exceeds an allowable difference limit or not. The allowable difference is a very slight difference caused by a trivial communication error or the like even if the system clocks in the server and the client are synchronized with each other. Such a trivial difference which does not exceed the limit is neglected and the limit value (preset time for correction) may be determined arbitrary by the server.

If the difference exceeds the limit, the flow goes to step SD8 in accordance with instruction indicating "no". If the difference does not exceed the limit, the flow goes to step SD7 in accordance with instruction indicating "yes".

In step SD8, a detected time difference counter value 24d (FIG. 6) will be corrected as follows. If the client's timestamp is delayed, the detected time difference counter value is corrected so as to be gained. On the contrary, if the client's timestamp is advanced, the detected time difference counter value is corrected so as to be reduced. An initial value of the detected time difference counter is 0. If a value of the detected time difference counter is positive, the timestamp is delayed, and if a value of the detected time difference counter is negative, the timestamp is advanced.

The CPU determines whether there is a difference between the timestamps or not every time the CPU receives the packet. If there is a difference between the timestamps, the detected difference counter counts the number of (cumulated) times the differences each exceeds the allowable difference limit (preset time for correction) appears. If the counted value exceeds a predetermined value, the difference detection processing shown in FIG. 13 is carried out so that the timestamp is corrected. Then the flow goes to step SD9.

In a case where the difference does not exceed the allowable difference limit, on the contrary, the detected difference counter reduces its absolute value in step SD7. For example, if the detected difference counter value is 5, it is corrected to be 4, and if the value is −5, it is corrected to be −4.

The time difference between the timestamps appear irregularly. If the time difference does not appear in the current packet reception even though the time difference was detected in the former packet reception, it is determined that the time difference between the timestamps is recovered, and the detected difference counter reduces its absolute value. In this case, the detected difference counter is reset to 0. Then, the flow goes to step SD9.

In step SD9, the received data packets are buffered. The packets are categorized into data types of the audio data, the MIDI data and the image data, and the categorized packets are buffered in buffer memories prepared for each data type. The categorization of the data packets is based on the data ID 42 (FIGS. 4A and 4B) given to each packet. Then, the reception processing executed by the client is completed.

Figure 12:
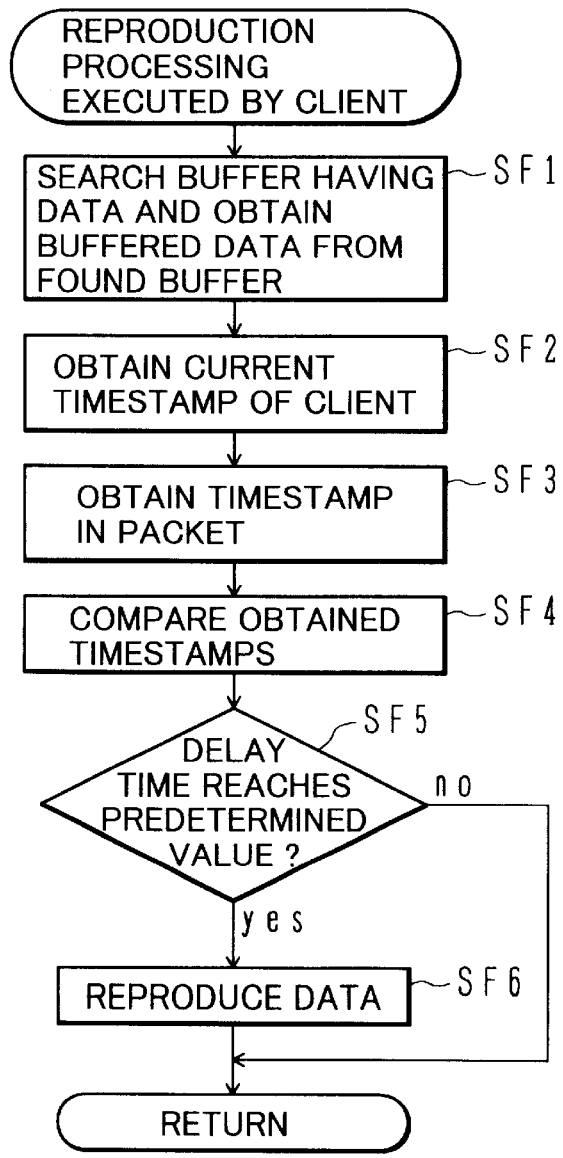
FIG. 12 is a flowchart showing reproduction processing executed by the client.

FIG. 12 is a flowchart showing reproduction processing executed by the client.

In step SF1, the CPU constantly accesses each buffer memory (for example, MIDI data buffer, audio data buffer, and the like) to check the existence of the data. When the CPU finds out data in any buffer memory, the CPU reads the data concerned.

In step SF2, the CPU obtains the current client's timestamp. The obtained timestamp is counted up in accordance with the timestamp processing shown in FIG. 11.

In step SF3, the CPU obtains the timestamp (server's timestamp) in the packet corresponding to data read out in step SF1.

In step SF4, the CPU compares the client's timestamp obtained in step SF2 and the in-packet timestamp of the server obtained in step SF3. If there is a difference between them, the CPU recognizes the difference as delay time.

In step SF5, the CPU determines whether the delay time reaches a predetermined value. The delay time corresponds to time required for accumulating data in the buffer, which is, for example, 3 seconds.

If the amount of delay time reaches the predetermined value, the flow goes to step SF6 in accordance with instruction indicating "yes" to reproduce the data. If the amount of delay time does not reach the predetermined value, the flow returns to the beginning of the reproduction processing in accordance with instruction indicating "no" and the data reproduction is not carried out until the CPU detects that the delay time reaches the predetermined value. After the data reproduction is carried out, the reproduction processing is completed.

The aforementioned data reproduction after data buffering only for a predetermined time period (for example, 3 seconds) prevents problems caused by a time difference between packets and also corrects packet disorder.

FIG. 13 is a flowchart showing a process of detecting frequency of timestamp differences executed by the client. This process may be executed constantly or may be executed between steps SD8 and SD9 in FIG. 10.

In step SG1, the CPU determines whether the counted value of the detected difference counter exceeds a predetermined value or not. The detected difference counter is a counter which counts the number of (cumulated) times the differences each exceeds the allowable difference limit (preset time for correction) appear, and this count operation is executed in step SD8 in FIG. 10. If the counted value exceeds the predetermined value, the CPU determines that the time difference is continuous one which requires correction.

If the counted value exceeds the predetermined value, the flow goes to step SG2 in accordance with instruction indicating "yes" to correct the timestamp. If the counted value does not exceed the predetermined value, the processing is completed without any correction in accordance with instruction indicating "no" because the CPU determines that the time difference is a temporary phenomenon.

In step SG2, the detected difference counter sends its count value to a timestamp correction module, then the detected difference counter is cleared. The timestamp correction module corresponds to a process shown in FIG. 14.

In step SG3, processing which invokes the timestamp correction module is executed. For example, the timestamp correction module may be invoked in response to a flag is set, or the timestamp correction module may be invoked directly. Thus, the process of detecting frequency of timestamp difference appearances is now completed.

FIG. 14 is a flowchart showing a process executed by the timestamp correction module in the client.

In step SH1, the timestamp correction module obtains the counted value which is sent from the detected time difference counter as an argument in step SG2.

In step SH2, the CPU determines whether the client's timestamp is delayed or advanced based on the counted value of the detected time difference counter. For example, if the detected time difference counter indicates a positive value, the timestamp is delayed, on the contrary, if the detected time difference counter indicates a negative value, the timestamp is advanced.

Then, it is determined whether the timestamp should be set ahead or back based on the determination whether the timestamp is delayed or advanced. If the client's timestamp is delayed, it is set ahead. On the contrary, if the client's timestamp is advanced, it is set back.

In step SH3, a suitable correction value in accordance with the preset time for correction (allowable difference limit) in step SD6 shown in FIG. 10 is read out from a table or the like. The read correction value is set to a correction value register. For example, if the preset time for correction is 300 msec, "3" is set to the correction value register.

In step SH4, the CPU determines whether the value set in the correction value register is 0 or not. If the value is not "0", the flow goes to step SH5 in accordance with instruction indicating "no".

In step SH5, a predetermined value is added to the timestamp or the predetermined value is subtracted from the timestamp. The predetermined value represents correction time which corresponds to the correction value. For example, if the predetermined value is "1", it represents 100 msec (FIG. 1B) which corresponds to the correction value of "1". In accordance with the desision of step SH2, either addition or subtraction is executed.

In step SH6, the predetermined value is subtracted from the correction value. In this case, the predeterminned value is, for example, "1". Then the flow goes back to step SH4 after a predetermined period of time has lapsed. In this case, the predetermined time period is, for example, 5 seconds (FIG. 1B).

In step SH4, the CPU determines again whether the correction value set in the correction value registrer is 0 or not. If the correction value is not "0", steps SH5 and SH6 are repeated. After the CPU detects that the correction value in the correction value register is 0, the process of the timestamp correction module is completed.

Until the correction value in the correction value register becomes 0, a process SH10 which includes steps SH4, SH5 and SH6 is executed constantly (for example, 5 seconds intervals).

Accordingly, if it is detected that the time difference between the timestamps which is larger than the predetermined vlaue (for example, 300 msec) appears for predetermined times or more, the timestamp is corrected gradually at predetermined intervals (for example, 5 sec). The time difference is reduced for a predetermined time period (for example, 100 msec). In other words, if a time difference is 300 msec, the timestamp is corrected three times each 100 msec is reduced, and the total period of time for correction is 15 seconds. Thus, the time difference is reduced gradually and smoothly. This prevents the data reproduction rate from changing radically, thus the data is reproduced smoothly.

When the time difference between the timestamps in the packet and the client's timestamp exceeds the predetermined value, sounds are generated by the data reproduction process (steps SF5 and SF6 in FIG. 12). Therefore, all notes are generated without omission even if the above timestamp correction is carried out.

According to the embodiment, the client starts data reproduction after buffering the received data for a predetermined time period (for example, 3 seconds). Thus, the data is reproduced with correct play time and correct packet order even if the required communication time differs packet by packet, or packet disorder occurs.

If the client's timestamp is advanced, the time period required for data buffering is gradually shortened, and the time period required for buffering becomes 0 eventually. As a result, the client loses its data buffering function.

On the contrary, if the client's timestamp is delayed, data pieces are buffered one after another. If the buffer capacity is small, some of the data packets may be overflowed and lost.

If the client detects that there is time difference between its own timestamp and the server's timestamp (advanced or delayed), the client itself corrects the difference. Thus, the above problems are solved. If the difference is large, several times of correction is carried out so as to reduce the difference gradually not at once. As a result, the data pieces are reproduced smoothly during timestamp correction.

The embodiment is not limited to a case for communicating the audio data or MIDI data through the internet. For example, the embodiment may be employed in other communications such as IEEE 1394 standardized digital serial communications and satellite communications.

The present invention has been explained referring to the embodiment. However, the present invention is not limited to the embodiment, and various modifications, improvements, combinations, etc. are possible, as should be apparent to those skilled in the art.

What is claimed is:

1. A communication device comprising:
   a receiver which receives externally supplied first time information representing time;
   a time information generator which generates second time information representing time;
   a time difference detector which detects a time difference between the times represented by the received first time information and the second time information generated at a time point at which the first time information is received; and
   a corrector that counts the number of discrepancy instances at which the time difference detector detects a time difference that is greater than a predetermined value, and corrects the second time information generated by said time information generator based on the received first time information when the number of discrepancy instances reaches a predetermined number.

2. The communication device according to claim 1, wherein said corrector corrects the second time information plural number of times so as to reduce the time difference gradually.

3. The communication device according to claim 2, wherein said corrector corrects the second time information with a predetermined amount plural number of times at predetermined intervals.

4. The communication device according to claim 1, wherein said corrector determines whether the time difference represents a delay or advance of the time represented by the second time information with respect to the time represented by the first time information, and counts the number of times the amount of the delayed time becomes greater than the predetermined value and the amount of the advanced time becomes greater than the predetermined value, respectively.

5. The communication device according to claim 1, wherein said corrector decrements the count value thereof when the time difference detected by said time difference detector is not greater than the given value.

6. The communication device according to claim 1, wherein said time information generator starts to generate the second time information after a reference time of the second time information is set in accordance with a reference time of the first time information received by said receiver.

7. The communication device according to claim 6, wherein said time information generator starts to generate the second time information after the reference time of the first time information received by said receiver is set to the reference time of the second time information as is.

8. The communication device according to claim 1, wherein said receiver receives the first time information and data corresponding to the first time information, said receiver further comprising:
- a buffer which stores the data received by said receiver; and
- a data processor which starts to process the data corresponding to the first time information stored in said buffer, after a predetermined time period has lapsed since the first time information is received.

9. The communication device according to claim 8, wherein said data processor starts to process the data corresponding to the first time information stored in said buffer, after the predetermined time period indicated by the second time information has lapsed since the first time information is received.

10. A communication method comprising the steps of:
- (a) receiving externally supplied first time information representing time;
- (b) generating second time information representing time;
- (c) detecting a time difference between the times represented by the received first time information and the second time information generated at a point where the first time information is received; and
- (d) counting a number of instances at which the detection step (c) detects the time difference being greater than a predetermined value and correcting the second time information when the number of instances reaches a predetermined number.

11. The communication method according to claim 10, wherein said step (d) corrects the second time information over a plural number of times so as to reduce the time difference gradually.

12. The communication method according to claim 11, wherein said process (d) corrects the second time information with a predetermined amount plural number of times at predetermined intervals.

13. The communication method according to claim 10, wherein said step (d) determines whether the time difference represents a delay or advance of the time represented by the second time information with respect to the time represented by the first time information, and counts the number of instances at which the amount of the delayed time becomes greater than the predetermined value and the amount of the advanced time becomes greater than the predetermined value, respectively.

14. The communication method according to claim 10, wherein said step (d) decrements the count value thereof when the time difference detected by said step (c) is not greater than the given value.

15. The communication method according to claim 10, wherein said step (d) starts to generate the second time information after a reference time of the second time information is set in accordance with a reference time of the first time information received by said step (a).

16. The communication method according to claim 15, wherein said step (d) starts to generate the second time information after the reference time of the first time information received by said step (a) is set to the reference time of the second time information as is.

17. The communication method according to claim 10, wherein said step (a) receives the first time information and data corresponding to the first time information, said step (a) further comprising the steps of:
- (f) storing the data received by said step (a) in a buffer;
- (g) starting to process the data corresponding to the first time information stored in said buffer, after a predetermined time period has lapsed since the first time information is received.

18. The communication method according to claim 17, wherein said step (g) starts to process the data corresponding to the first time information stored in said buffer, after a predetermined time period indicated by the second time information has lapsed since the first time information is received.

19. A recording medium storing a program containing executable instructions for causing a computer to execute the steps of:
- (a) receiving externally supplied first time information representing time;
- (b) generating second time information representing time;
- (c) detecting a time difference between the times represented by the received first time information and the second time information generated at a time point where the first time information is received; and
- (d) counting a number of instances at which the detection step (c) detects the time difference being greater than a predetermined value, and correcting the second time information when the number of instances reaches a predetermined number.

20. The recording medium storing the program according to claim 19, wherein said step (d) corrects the second time information plural number of times so as to reduce the time difference gradually.

21. The recording medium storing the program according to claim 20, wherein said process (d) corrects the second time information with a predetermined amount plural number of times at predetermined intervals.

22. The recording medium storing the program according to claim 19, wherein said step (d) determines whether the time difference represents delay or advance of the time represented by the second time information with respect to the time represented by the first time information, and counts the number of instances at which the amount of the delayed time becomes greater than the predetermined value and the amount of the advanced time becomes greater than the predetermined value, respectively.

23. The recording medium storing the program according to claim 19, wherein said step (d) decrements the count value thereof when the time difference detected by said step (c) is not greater than the given value.

24. The recording medium storing the program according to claim 19, wherein said step (b) starts to generate the second time information after a reference time of the second time information is set in accordance with a reference time of the first time information received by said step (a).

25. The recording medium storing the program according to claim 24, wherein said step (b) starts to generate the second time information after the reference time of the first time information received by said step (a) is set to the reference time of the second time information as is.

26. The recording medium storing the program according to claim 19, wherein said step (a) receives the first time information and data corresponding to the first time information, said step (a) further comprising the steps of:
- (e) storing the data received by said step (a) in a buffer;
- (f) starting to process the data corresponding to the first time information stored in said buffer, after a predetermined time period has lapsed since the first time information is received.

27. The recording medium storing the program according to claim 26, wherein said step (f) starts to process the data corresponding to the first time information stored in said buffer, after a predetermined time period indicated by the second time information has lapsed since the first time information is received.

28. A communication device comprising:

reception means for receiving externally supplied first time information representing time;

time information generation means for generating second time information representing time;

time difference detection means for detecting a time difference between the times represented by the received first time information and the second time information generated at a time point at which the first time information is received; and correction means for counting a number of instances at which the time difference detection means detects the time difference being greater than a predetermined value, and correcting the second time information generated by said time information generation means based on the received first time information when the number of instances reaches a predetermined number.

29. A communication device according to claim 1, wherein the first time information is supplied from an external device that operates in accordance with a first system clock signal, wherein the communication device operates in accordance with a second system clock signal that is not synchronized with the first system clock signal, and wherein the receiver further receives the packet from the external device that generates the first time information in accordance with the first system clock signal and supplies the packet added with the first time information.

30. A communication device according to claim 1, further comprising a counter that counts a number of instances when the time difference detector detects the time difference and reduces/increases the number of time in accordance with advancement/delay of the second time information to the first time information, wherein the corrector corrects the second time information when the number of time reaches a predetermined time.

31. A communication method according to claim 10, wherein the first time information is supplied from an external device that operates in accordance with a first system clock signal, wherein the communication method is performed in accordance with a second system clock signal that is not synchronized with the first system clock signal, and wherein the receiving step (a) further receives the packet from the external device that generates the first time information in accordance with the first system clock signal and supplies the packet added with the first time information.

32. A communication method according to claim 10, further comprising the step of counting a number of time when the detecting step (c) detects the time difference and reducing/increasing the number of time in accordance with the advancement/delay of the second time information to the first time information, wherein the correcting step (d) corrects the second time information when the number of time reaches a predetermined time.

* * * * *